US012123233B2

(12) United States Patent
Scelzi et al.

(10) Patent No.: US 12,123,233 B2
(45) Date of Patent: Oct. 22, 2024

(54) ROTARY ACTUATED SLAM LATCH SYSTEM

(71) Applicant: Scelzi Enterprises, Inc, Fresno, CA (US)

(72) Inventors: Gary E. Scelzi, Fresno, CA (US); Mike M. Scelzi, Fresno, CA (US)

(73) Assignee: Scelzi Enterprises, Inc., Fresno, CA (US)

( * ) Notice: Subject to any disclaimer, the term of this patent is extended or adjusted under 35 U.S.C. 154(b) by 699 days.

(21) Appl. No.: 17/174,273

(22) Filed: Feb. 11, 2021

(65) Prior Publication Data

US 2022/0251888 A1 Aug. 11, 2022

(51) Int. Cl.
*E05C 9/04* (2006.01)
*E05C 9/14* (2006.01)

(52) U.S. Cl.
CPC ................ *E05C 9/042* (2013.01); *E05C 9/14* (2013.01)

(58) Field of Classification Search
CPC ... E05C 9/04; E05C 9/042; E05C 9/14; E05C 9/08
USPC ........................................................... 292/36
See application file for complete search history.

(56) References Cited

U.S. PATENT DOCUMENTS 2,729,089 A * 1/1956 Pelcin ................. E05B 47/0002 70/151 R
3,953,061 A * 4/1976 Hansen ................... E05C 9/042 292/34
5,778,708 A * 7/1998 Crosby ............... E05B 65/0075 292/DIG. 60
6,176,041 B1 * 1/2001 Roberts ................... E05C 9/045 70/130
6,607,221 B1 * 8/2003 Elliott ..................... E05C 9/043 49/446
8,177,264 B2 * 5/2012 Iwakami ............... B63B 25/002 292/DIG. 43
8,465,062 B2 * 6/2013 Weinerman ............... E05C 1/16 292/137
8,657,345 B1 * 2/2014 Shih .................... E05B 63/0056 292/37
9,514,971 B2 * 12/2016 Phark ................ H01L 21/67373
2007/0080096 A1 * 4/2007 Miyajima ......... H01L 21/67126 206/710
2016/0368543 A1 * 12/2016 Puscas .................. B62D 33/03
(Continued)

*Primary Examiner* — Eugene G Byrd
*Assistant Examiner* — James Edward Ignaczewski
(74) *Attorney, Agent, or Firm* — Sherrie M. Flynn; Aisha O. Otori; Coleman & Horowitt LLP

(57) ABSTRACT

Rotary actuated latch systems with linearly acting latch rods, and methods of assembling rotary actuated latch systems with linearly acting rods are disclosed. In some aspects, the rotary actuated latch systems are "self-engaging" and comprise a handle having two guides, the handle operably attached to a spring, two latch rods comprising clevises operably attached to the two guides, and at least two strike plates for actuating the latching system without additional user input. The spring applies equal tension to the two linearly acting latch rods, allowing for smooth operation of the latching system without binding while providing for a compact design that eliminates stresses imposed by conventional latch systems where the latch rods rotate off-axis. In some embodiments, the rotary actuated latch system may be assembled as a complete unit, prior to installation on the mechanism to be latched.

20 Claims, 5 Drawing Sheets

(56) References Cited

U.S. PATENT DOCUMENTS

| | | | | |
|---|---|---|---|---|
| 2018/0347241 | A1* | 12/2018 | Nakasone | ................. E05C 9/04 |
| 2020/0286759 | A1* | 9/2020 | Matsutori | ......... H01L 21/67373 |

* cited by examiner (DETAIL A)

(DETAIL B)

SECTION B-B

ROTARY ACTUATED SLAM LATCH SYSTEM

FIELD OF THE INVENTION

The present invention generally relates to the field of mechanical latches. More specifically, embodiments of the present invention relate to a novel mechanical latching system that has "self-latching" capabilities and is applicable to mechanisms to be latched such as doors, drawers, bins or any hinged, sliding or rolling cover required to be secured in a position.

DISCUSSION OF THE BACKGROUND

Mechanical latching systems are used in many applications. For example, commercial vehicles, toolboxes, motorhomes, trailers, tanker vehicles, construction equipment machinery, off-highway vehicles, forestry machinery, etc., all may use some form of a latching system to mechanically secure various mechanisms (e.g., doors, drawers, bins, cabinets, retractable covers, etc.) Although there are a multitude of conventional latching systems (e.g., compression latches, flush mounted latches, T-handle latches, paddle latches, rotary latches, spring latches, etc.), many, if not most typical mechanical latching systems require actuation, specifically, the turning of a handle or the moving of another actuation device in order to operate (i.e., engage or disengage) the latch system. Self-engaging ("slam") latch systems exist, including slam latch systems having latch rods that secure the mechanism (door, drawer, bin, etc.) to a portion of the vehicle, toolbox, motorhome, trailer, etc., but these conventional slam latch systems, particularly those having lock or latch rods, are complex and/or bulky in design, complicating the installation of the latch system and increasing the potential for premature failure. Conventional mechanical latching systems with latch rods also require that the latch rods rotate "off-axis" (i.e., the rods are non-linear acting). These conventional mechanisms typically use a cam plate that when operated rotates the rods, requiring additional design components and creating additional stresses on the latching mechanism, and in particular, the rods themselves.

Therefore, it is desirable to provide a simple mechanical latching system that is compact, self-latching, and does not require the rods to rotate about the center of a handle or cam to retract and extend the latch rods.

SUMMARY OF THE INVENTION

The present invention advantageously provides rotary actuated latch systems with linearly acting latch rods that may be "self-engaging." In other words, when a mechanism to be latched is moved to a predetermined position, the latch system engages, without further input or action on the part of a user of the system.

The rotary actuated latch system comprises a handle having two guides, the handle operably attached to a spring, two latch rods comprising clevises at ends of the rods, the clevises operably attached to the two guides, and at least two strike plates for actuating the latching system without additional user input. The mechanical action of the latch rods hitting the strike plates rotates the handle and gives the mechanism a slamming function with no additional control mechanism. The spring applies equal tension to the two linearly acting latch rods, allowing for smooth operation without binding while providing a compact design that eliminates stresses imposed by conventional latch systems where the latch rods rotate off-axis.

In embodiments of the present invention, the latch system also comprises a base plate on which the other components of the latch system may be mounted, allowing the latch system to be manufactured separately and supplied as a complete subassembly for installation on the mechanism to be latched.

It is therefore an object of the invention to provide a simple, compact rotary actuated latch system that may be self-engaging.

It is also an object of the invention to provide a rotary actuated latch system with latch rods that extend and retract linearly along a common axis.

It is also an object of the invention to provide a rotary actuated latch system with few potential failure points.

It is a further object of the invention to provide a rotary actuated latch system that can function in a limited space.

It is a further object of the invention to provide a rotary actuated latch system that may be manufactured as a complete subassembly, separate from the mechanism to be latched.

It is to be understood that both the foregoing general description and the following detailed description are exemplary, but not restrictive, of the invention. A more complete understanding of the rotary actuated slam latch system disclosed herein will be afforded to those skilled in the art.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents that may be included within the spirit and scope of the invention. Furthermore, in the following detailed description of the present invention, numerous specific details are set forth in order to provide a thorough understanding of the present invention. However, it will readily be apparent to one skilled in the art that the present invention may be practiced without these specific details.

Embodiments of the present invention advantageously provide a two-point latching system with a single rotating control handle allowing actuation of two independent latch rods in a directly opposing linear motion. Allowing the latch rods to move only linearly along one common axis provides for a latch system that is compact and, unlike conventional latch rod systems, does not require that the latch rods rotate about the center of the rotating handle or cam to retract and extend the latch rods.

In "self-engaging" embodiments, the latching system utilizes strike plates having a particular geometry (i.e., ramp portions and back portions) that actuate the latch rods to self-engage the latch mechanism without additional user action or input. The geometry of the guides in the handle allows the two point system to utilize a single torsion spring to provide equal tension to both latch rods and allow the action of the latch rods hitting the strike plates to rotate the handle system independent of any user action. This gives the mechanism a slamming (self-engaging) function with no additional control mechanism. Alternatively, the latch system may be engaged by manually rotating the handle. Both self-engaging and manual operation of the latch system are described below.

Exemplary Self-Engaging Rotary Actuated Slam Latch System

Figure 2A:
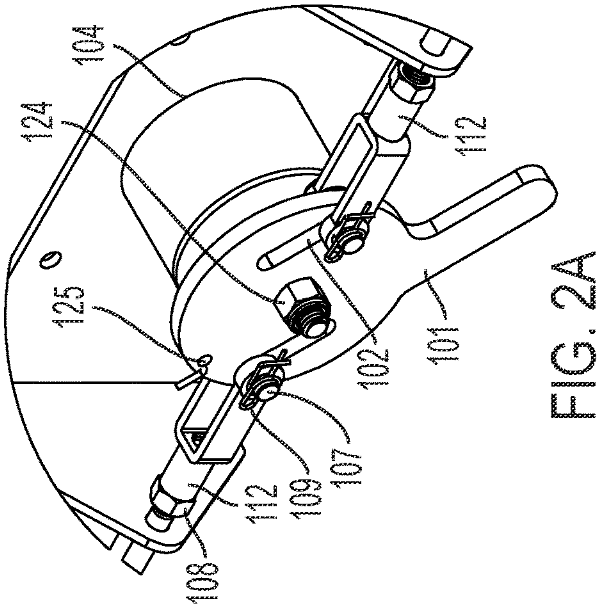
FIG. 2A is an enlarged view of the rotating handle of the embodiment of FIG. 1.
Figure 2B:
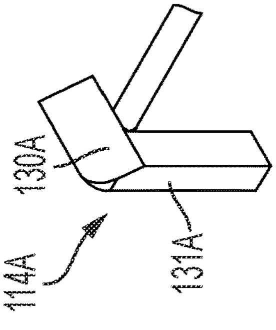
FIG. 2B is an enlarged view of a strike plate of the embodiment of FIG. 1.

Referring now to FIGS. 1, 2A-2B and 3A-3C, an exemplary self-engaging rotary actuated slam latch system 100 comprises (a) a handle 101 having two guides 102, the handle 101 operably connected to a spring 103; (b) two latch rods 111, the latch rods 111 comprising clevises 112 at ends, the clevises 112 operably connected to the two guides 102; and (c) at least two strike plates 114A & 114B. As can be seen in FIG. 2B, the strike plate 114A comprises a ramp portion 130A and a back portion 131A. Strike plate 114B is opposite hand (a mirror image) to strike plate 114A and also comprises a ramp portion 130B and a back portion 131B. In FIGS. 1, 2B and 3A-3C, the latch system is shown engaged. In other words, opposite ends of the latch rods 111 (opposite to the clevis ends) are shown in contact with the strike plates 114A & 114B.

When the slam latch system is installed, the strike plates 114A & 114B are attached and/or connected to a fixed item (e.g., a drawer frame, a door frame, a compartment of a truck body, etc.). The balance of the latch system 100 is attached and/or connected to the mechanism to be latched (i.e., a drawer, a door, a rolling cover, etc.). To operate the self-engaging latch system 100, a user moves the mechanism to be latched, and when the opposite ends of the latch rods 111 contact the ramp portions 130A & 130B of the strike plates 114A & 114B, the ramp portions 130A & 130B cause (i) the latch rods 111 to retract linearly along the longitudinal axis of the latch rods 111, decreasing a distance from the ends of the latch rods 111 to the center of the handle 102, (ii) the clevises 112 to move within the guides 102; and (iii) the handle 101 to rotate in a direction (e.g., clockwise) increasing tension on the spring 103. As the mechanism to be latched continues to move (as a result of the force initially applied to the mechanism by the user), the latch rods 111 move beyond the ramp portions 130A & 130B of the strike plates 114A & 114B, and the tension in the spring 103 causes (i) the clevises 112 to move within the guides 102, (ii) the handle 101 to rotate in an opposite direction (e.g., counterclockwise) causing the latch rods 111 to extend linearly along the axis, and (iii) the latch rods 111 to contact the back portion 131A & 131B of the strike plates 114A & 114B, thereby engaging the self-engaging latch system 100.

The latch system 100 may be disengaged from the strike plates 114A & 114B by manually rotating the handle 101 in the direction (e.g., clockwise), causing the clevises 112 to move within the guides 102, decreasing a distance from the ends of the latch rods 111 to the center of the handle 101, and linearly retracting the latch rods 111 along the axis, allowing the mechanism to move beyond the strike plates 114A & 114B. To allow the mechanism to move, the latch rods retract a distance sufficient to overcome the depth of the ramp portions 130A & 130B of strike plates 114A & 114B. FIG. 2B shows the particular geometry of strike plate 114A, including ramp portion 130A and back portion 131A. Strike plate 114B has the same geometric configuration, including ramp portion 130B and back portion 131B, but is opposite hand (a mirror image) of strike plate 114A.

The particular geometry of the handle 101 and guides 102 constrain movement of the latch rods 111 to linear movement along the longitudinal axis of the latch rods 111. A length of the guides 102 determines the distance to which the latch rods 111 may extend and retract. The geometry of handle 101 allows full travel of the latch rods 111 with about a 30 to 60 degree (in preferred embodiments about 50 degree) rotation of the handle 101. The guides 102 are positioned substantially parallel to one another, on opposite sides of the center of handle 101 (opposite sides of nut 124), and allow the force exerted on the latch rods 111 when contacting the strike plates 114A & 114B in a closing motion to rotate the handle without assistance from an operator of the latch system 100.

Preferably, spring 103 is a torsion spring. The torsion spring 103 applies equal pressure to each of the latch rods 111, thereby preventing binding of the latch system 100 when the latch rods 111 move linearly, or when the mechanism to be latched is moved by a user. The torsion spring may be of any configuration to suit the application, and may have legs that are straight, offset, hinged or hooked at the ends, or a combination thereof. The inside diameter of the torsion spring, spring rate and deflection are also determined by the physical constraints of the application.

In some aspects, each clevis 112 comprises a pin 107 that rotates and moves within one of the guides 102 as the handle 101 turns. The pin 107 may be grooved, the groove sized to fit a clip 109 (e.g., an e-clip or other type of clip), or an external retaining ring. Alternatively, the pin 107 may have a through hole in the shank, and a cotter pin in the through hole to hold the pin 107 in place in the clevis 112. In some aspects the clevises 112 may also comprise lock nuts 108 for adjusting the length of the latch rods 111.

As shown in FIGS. 1 and 3A-3C, the latch system may further comprise a base plate 121 for mounting the latch system 100 to a mechanism to be latched (e.g., a door, drawer, roll top cover, etc.). In embodiments comprising a base plate, the latch system 100 may be supplied as a complete subassembly, allowing the latch system 100 to be manufactured separately from the mechanism to be latched. The base plate 121 may comprise mounting holes 132 for screwing or bolting the base plate 121 to the mechanism to be latched. The number of mounting holes 132 may vary depending on the physical properties of the mechanism to be latched and an overall length of the latch system 100. For example, the base plate 121 may in some aspects have from 2-16 (or more) mounting holes 132. In some embodiments, the base plate may not have any mounting holes and may be tacked welded, welded or soldered to the mechanism to be latched.

Figure 6:
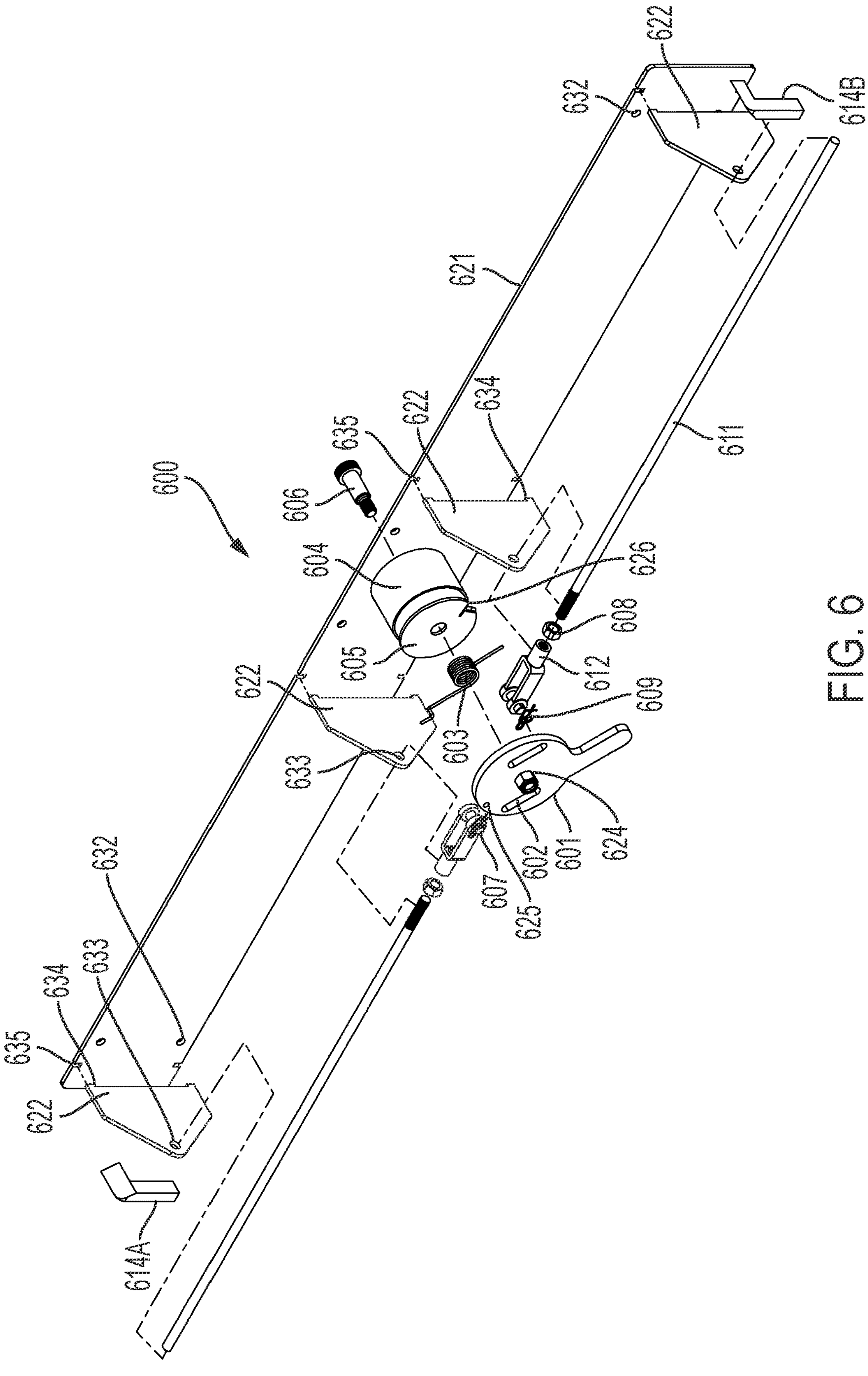
FIG. 6 is an exploded view of a rotary actuated slam latch system.

The base plate 121 may also comprise rod guides 122 having guide cutouts (e.g., guide cutouts 633 of FIG. 6). The latch rods 111 move linearly within the guide cutouts along the longitudinal axis of the latch rods 111. In FIGS. 1 and 3A-C, the latch system is shown with four rod guides 122. In some aspects, however, the base plate 121 may comprise more or less than four rod guides 122, but preferably, will comprise an even number of rod guides (e.g., 2, 6, 8, etc.) with half of the rod guides 122 attached to each half of the base plate 121.

The rods guides 122 and guide cutouts serve to support the linear movement of the latch rods 111. In embodiments utilizing latch rods with a circular cross section, the diameter of the guide cutouts will be somewhat larger than the diameter of the latch rods 111. However, latch rods 111 may also have a cross section other than circular (e.g., square, rectangular, elliptical, etc.) and in such embodiments, the guide cutouts would be similarly shaped, with dimensions somewhat larger than the cross-sectional dimensions of the latch rods such that the latch rods may move within the guide cutouts.

In some aspects, the rod guides 122 may comprise protrusions which fit tightly into notches in the base plate 121 (see e.g., protrusions 634 and notches 635 of FIG. 6). In other aspects, the rods guides 122 may be attached to the base plate 121 by welding, tack welding and/or soldering. Additionally, in some embodiments, the rod guides may comprise miniature linear bearings (not shown) fixed within the guide cutouts for allowing smooth movement of the latch rods 111 within the rod guides 122.

The latch system 100 may further comprise a standoff 104, a cap 105 and a shoulder bolt 106 for connecting and/or attaching the handle 101 to the base plate 121. Preferably, the standoff is a tube with a circular cross section, but in some embodiments, may be of a different cross section (e.g., square, rectangular, elliptical, etc.). The height of the standoff 104, the thickness of the cap 105, and the body length (height) of the torsion spring 103 control a distance from the back of the handle 101 to the face of the base plate 121. The height of the standoff is determined by the application (i.e., the mechanism to be latched and other physical constraints of the application). In various embodiments, the height of the standoff may range from about 0.125 inches (in typical applications at least 0.5 inches) to about 12.0 inches. However, some embodiments may not comprise a standoff at all, and the cap 105 may be positioned directly against the base plate 121. In such embodiments the thickness of cap 105 and the body length of the torsion spring 103 control the distance from the face of the base plate 121 to the back of the handle 101.

Figure 1:
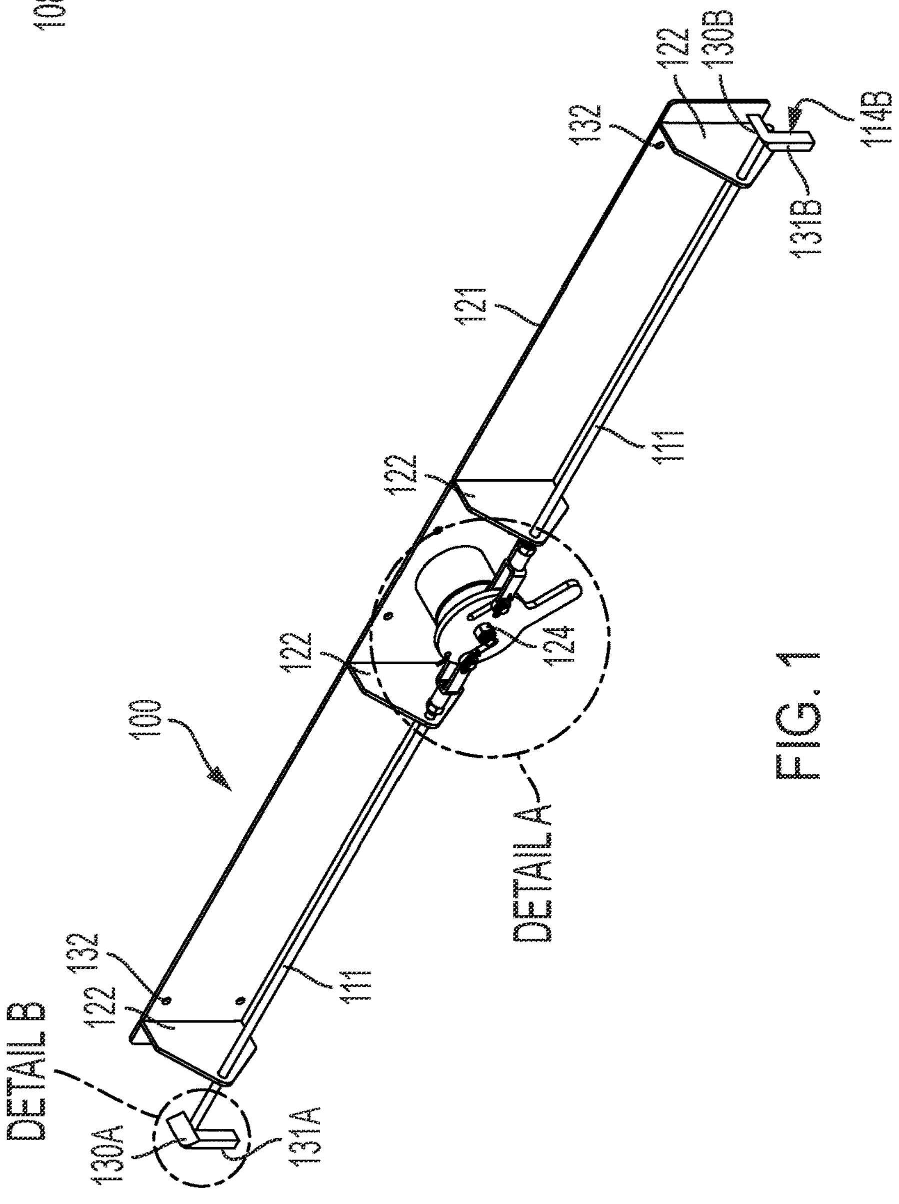
FIG. 1 is a perspective view of a rotary actuated slam latch system according to an embodiment of the present invention.
Figure 3A:
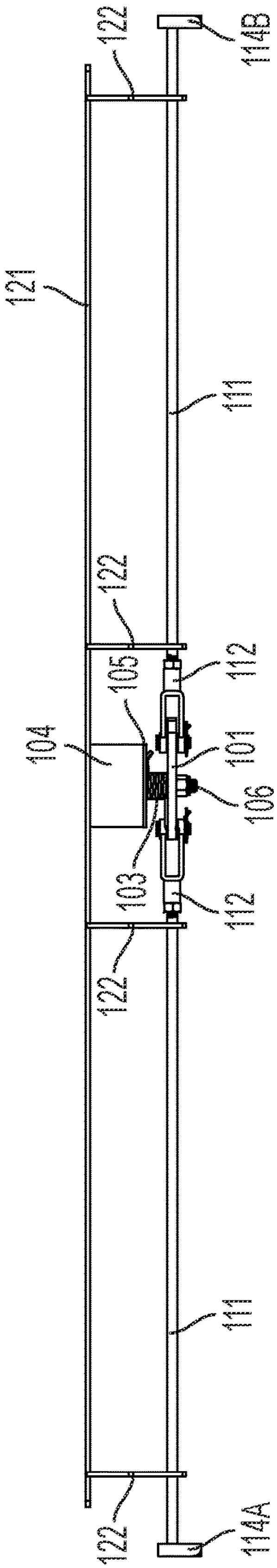
FIG. 3A is a plan view of the rotary actuated slam latch system of FIG. 1.
Figure 3B:
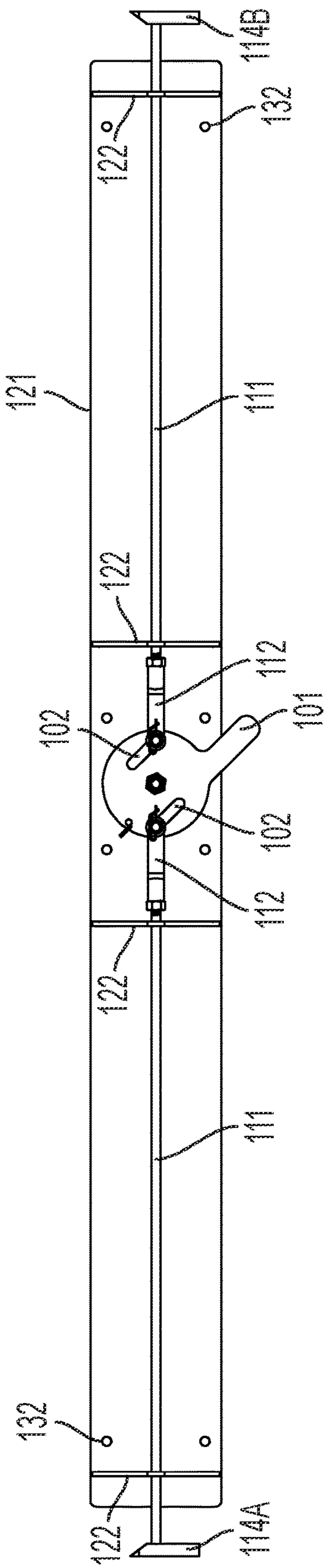
FIG. 3B is an elevation view of the rotary actuated slam latch system of FIG. 1.
Figure 3C:
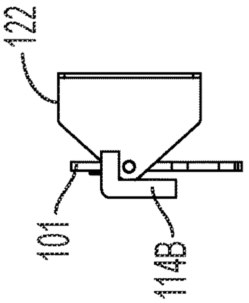
FIG. 3C is a right side view of the rotary actuated slam latch system of FIG. 1.

One face of the cap 105 is adjacent and/or attached to the standoff 104. The opposite face of the cap 105 is operably attached to a leg of the spring 103, and provides a surface on which the handle 101 may rotate. In some embodiments, the cap incorporates a cap holder for the leg of the spring 103 (see e.g., cap holder 626 of FIG. 6). The opposite leg of the spring 103 is operably attached to the handle 101, and may also comprise a handle holder 125, for attachment of the opposite leg of the spring 103 to handle 101. As shown in FIGS. 1 and 2A, the handle holder 125 may be a through hole, sized appropriately for the diameter of the opposite leg of the spring 103, or may be of any configuration that secures the opposite leg of the spring 103 to the handle 101.

In some aspects the cap 105 and the standoff may be cast or formed as one piece, while in other aspects the cap 105 and the standoff 104 may be two pieces joined or connected to one another via the shoulder bolt 106. The shoulder bolt 106 is threaded on one end and screws into a nut 124 on the outside face of the handle 102. In some embodiments the shoulder bolt 106 may be inserted through a bolt cutout (typically circular and not shown in the drawing figures) in base plate 121 such that the head of the shoulder bolt 106 is positioned against the back of cap 105. In preferred embodiments, shoulder bolt 106 is tack welded or welded to the back of cap 105. Similarly, the standoff 104 may be tacked welded or welded to base plate 121 (or connected by other conventional means) to secure standoff 104 to base plate 121 over the bolt cutout.

The various components of the latch system may comprise steel (e.g., carbon steel, tool steel, alloys of steel and/or stainless steel), aluminum and aluminum alloys (e.g., iron, silicon, copper, magnesium, manganese, zinc, etc.); plastics (e.g., ABS, polycarbonate plastic, plastic alloys, thermoplastic alloys, acrylic plastics, fiberglass reinforced plastics, etc.) and/or a combination of any of these materials. The torsion spring may also comprise music wire, spring steel and/or hard drawn steel Overall dimensions of the rotary actuated slam latch system may vary greatly, depending on the physical properties and dimensions of the mechanism to be latched, but typically may range from about 0.5 feet (6 inches) to about 20.0 feet in overall length, and about 1 inch to about 8 inches in overall width. The latch rods, if circular in cross section may range from about 0.125 inches in diameter to about 1.0 inches in diameter. Cross-sectional areas comparable to up to a 1.0 inch rod diameter may be used for latch rod cross-sectional shapes that are non-circular.

Exemplary Manual Engaging Rotary Actuated Latch System

Alternately, the latch system 100 may be used to manually latch a mechanism (e.g., a drawer, door, rolling cover, etc.). To do so, and instead of using the self-engaging (slam latch) feature, a user rotates the handle 101 in a direction (e.g., counterclockwise) opposite to the direction the handle 101 is rotated when the mechanism is unlatched, thereby causing the clevises to move within the guides 102, increasing a distance from the ends to the center of the handle 101, and linearly extending the latch rods 111 along an axis, engaging the latch rods 111. In some manually engaging latch system embodiments, the strike plates 114A & 114B may be used for manual engagement of the latch rods 111. However, in other manually engaging latch system embodiments, strike plates may not be required as the force of spring 103 is sufficient to engage the latch rods 111 and hold the mechanism against the a drawer frame, door frame, compartment of a truck body, tool box, etc.

The latch system 100 may be disengaged in the same manner as for the self-engaging slam latch system. Specifically, when the handle 101 is rotated in a direction (e.g., clockwise), the clevises 112 move within the guides 102, decreasing a distance from the ends to a center of the handle 101, and linearly retracting the latch rods 111 along the longitudinal axis of the latch rods 111, thereby disengaging the latch rods 111 and allowing the mechanism to move.

The various components of the manual latch system may be of the same geometry/configuration as those described for the self-engaging slam latch system and may comprise the same materials.

Exemplary Latch System Installation

Figure 4:
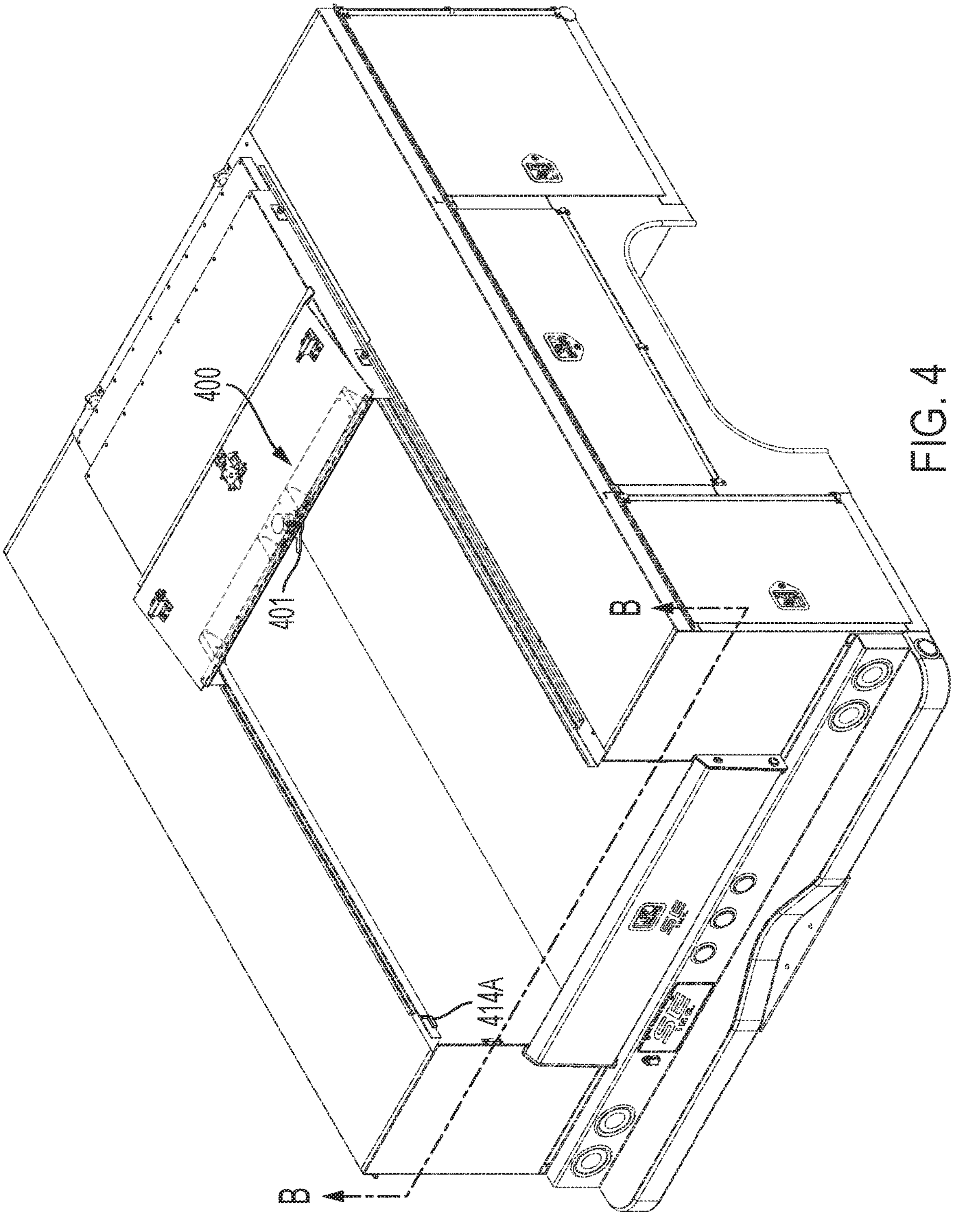
FIG. 4 is a perspective view of a rotary actuated slam latch system installed on a roller top cover of a truck service body according to an embodiment of the invention.

Referring now to FIG. 4, therein is shown a perspective view of a self-engaging latch system 400 installed on a mechanism (i.e., a roller top cover of a truck body). The latch system, except for the strike plates, are attached and/or connected to the roller top cover of the truck body. In the FIG. 4, the cover is hinged and folded back (approximately 180 degrees) onto a stationary portion of the truck body. Most of latch system 400 is hidden beneath the folded-back cover, except that a portion of handle 401 protrudes from under the roller top cover and is visible. Strike plate 414A is also visible and is attached to the truck body near or at the end of the horizontal portion of the truck body on which the roll top cover travels. Another strike plate (not visible in FIG. 4) is attached to the opposite side of the opening in the truck body, directly across from strike plate 414A. The latch system 400 is shown engaged, with the roller top cover of the truck body in an open position. In other words, the latch rods (e.g., latch rods 111 of FIG. 1) are in contact with a fixed portion of the truck body, and thus, hold the roll top cover in the open position.

To close the roller top cover, a user first disengages the latch system by rotating the handle 401 in a direction (e.g., clockwise), which causes the clevises (e.g., clevises 112 of FIG. 1) to move within the guides (e.g., guides 102 of FIG. 1). Rotation of the handle 401 and movement of the clevises cause the latch rods to retract along their longitudinal axis and disengage from the fixed portion of the truck body. The user may then move the roller top cover with the attached latch system (minus strike plates) along the horizontal portion of the truck body toward the end of the travel of the cover. Although the rotary latch system of FIG. 4 shows the cover in the fully open position, the latch system 400 may also be operated to hold the cover in a partially open (or closed) position. In other words, part way along the total length of travel of the cover.

If utilizing the self-engaging latch system, the user initially moves the roll top cover with enough force such that the roll top cover continues its travel along the fixed portion of the truck body until at or near the end of travel and until the latch rods contact the strike plate 414A and the second strike plate (e.g., 114B of FIG. 1) on the opposite side of the opening to be covered. Although the strike plate 414A is shown at or near the end of travel of the roll top cover, in some embodiments, additional strike plates may be utilized at intermediate locations to engage the latch system and hold the cover (or other mechanism to be latched) in a partially open (or closed) position.

The latch rods first contact ramp portions (e.g. ramp portions 130A and 130B of FIGS. 1 and 2B) causing: (i) the latch rods to again retract linearly along the axis, decreasing a distance from the ends of the latch rods to the center of the handle 401, (ii) the clevises (see e.g., clevises 112 of FIG. 1) to move within the guides (see e.g., guides 102 of FIG. 1); and (iii) the handle 401 to rotate in a direction (e.g., clockwise) increasing tension on a spring (e.g., spring 103 of FIG. 3A). When the latch rods move beyond the ramp portions of the strike plates, the tension in the spring causes: (i) the clevises to move within the guides of the handle 401, (ii) the handle 401 to rotate in an opposite direction (e.g., counterclockwise) causing the latch rods to extend linearly along the axis, and (iii) the latch rods to contact the back portion of the strike plates, thereby engaging the latch system 400 without further action by a user of the latch system 400.

If not using the self-latching slam latch function, after disengaging the latch rods as described above, the user simply moves the cover manually until the cover contacts the strike plates and then manually rotates the handle in a direction (e.g., counterclockwise) to engage the latch rods to the strike plates. As described above, the latch system 400 may also be operated manually without the use of strike plates and in such aspects, the latch rods would engage with a stationary portion of the truck body.

Figure 5:
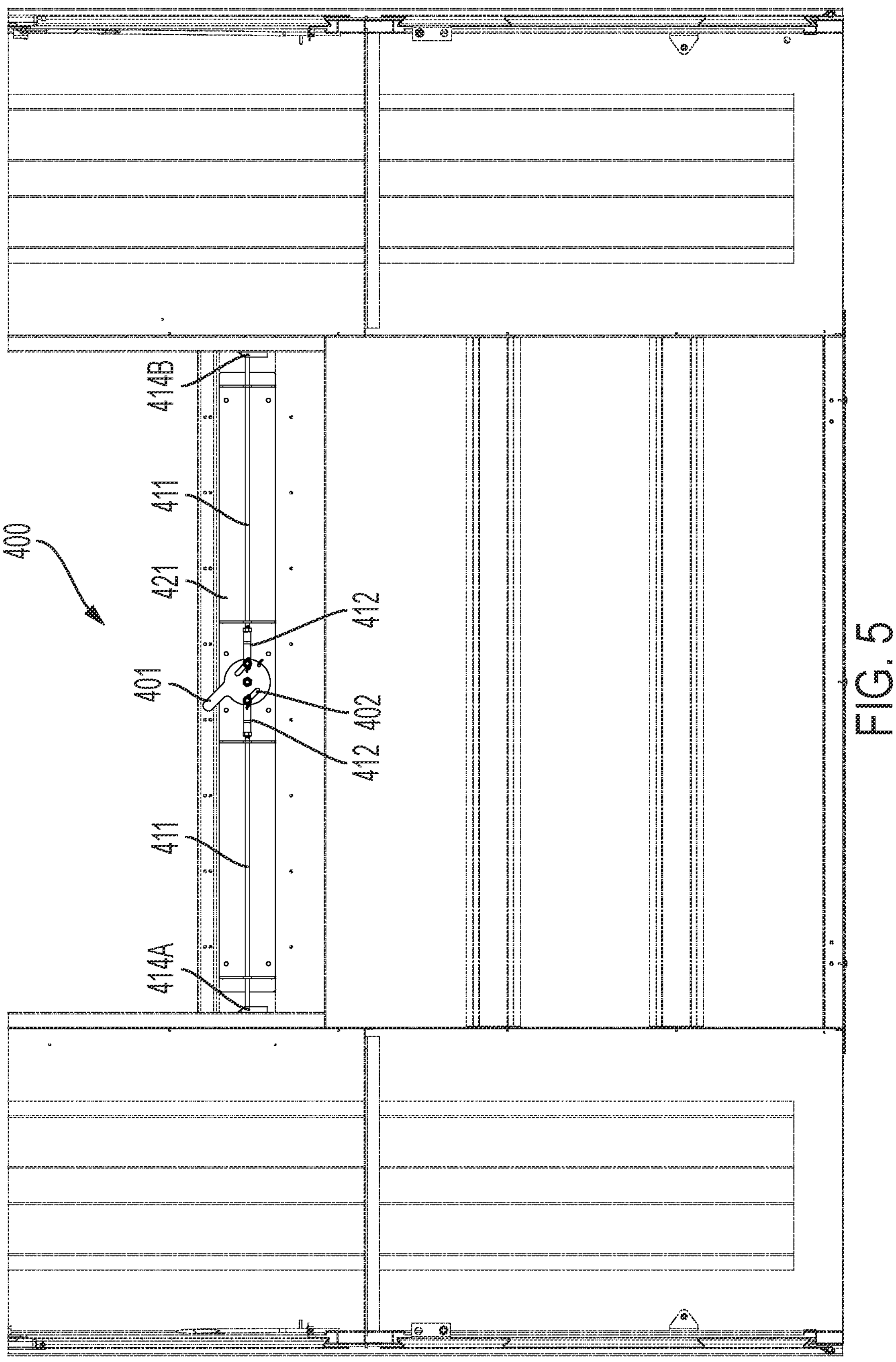
FIG. 5 is a section view of the installed rotary latch system of FIG. 4.

FIG. 5 is a section view looking upwards at the latch system 400 of FIG. 4. In this section view, the latch system 400 can easily be seen including handle 401, guides 402, latch rods 411, clevises 412, base plate 421 and strike plates 414A & 414B. Although the latch system 400 is shown installed on a roller top cover of a truck body, the latch system 400 may be installed on many other mechanisms, including but not limited to doors, drawings, bins, cabinets, retractable covers on items such as commercial vehicles, toolboxes, motorhomes, trailers, tanker vehicles, construction equipment machinery, off-highway vehicles, forestry machinery, etc.

Exemplary Rotary Latch System Assembly

Referring now to FIG. 6, therein is shown an exploded view of rotary slam latch system 600. In the exploded view, each component of the system and how the components may be assembled can be clearly seen.

Similar to FIG. 1, the rotary slam latch system 600 of FIG. 6 comprises a handle 601 having two guides 602, a spring 603, a standoff 604, a cap 605, a shoulder bolt 606, two latch rods 611, two clevises 612, each clevis with a pin 607, lock nut 608, and clip 609, and two strike plates 614A & 614B. The latch system also comprises a base plate 621 and four rod guides 622. Each of the rod guides 622 comprise two protrusions 634 and the base plate 621 comprises corresponding notches 635 for the protrusions 634 of each rod guide. The rod guides also comprise guide cutouts 633.

The latch system of FIG. 6 may be assembled by attaching and/or connecting the four rods guides 622 to the base plate 621 by inserting the protrusions 634 of each rod guide 622 into the corresponding notches 635 of the base plate 621. The protrusions 634 and notches 635 may be fabricated or machined with tight tolerances such that the rod guides "snap fit" into place. Alternately, or in addition, the four rod guides 622 may be tacked welded or welded or otherwise secured in place. Various numbers of rod guides may be used depending on the application.

The handle 601, spring 603, cap 605 and standoff 604 is assembled and/or operably connected using shoulder bolt 606 and nut 624. One leg of spring 603 is connected and/or attached to the cap 605 by inserting the leg of the spring 603 into cap holder 626, and the other end of spring 603 is connected and/or attached to the handle 601 by inserting the other end of the spring 603 into handle holder 625. In the embodiment of FIG. 6, cap holder 626 comprises a slotted cutout, and the cap 605 is partially bent or formed near the slotted cutout to secure the leg of the spring 603. The handle holder 625 comprises a through hole in which an opposite leg of spring 603 is inserted to secure the opposite end of the spring 603 to the handle 601. The shoulder bolt 606 is inserted into or through the standoff such that the head of shoulder bolt 604 is positioned against the back of cap 605. The handle 601, spring 603, cap 605 and standoff 604 are secured by screwing the nut 624 onto shoulder bolt 606. In some embodiments, shoulder bolt 606 may be tacked welded or welded to the back of cap 605. Alternatively, nut 624 may be tack welded or welded to the face of handle 601.

The assembled standoff 604, cap 605, spring 603, handle 601, shoulder bolt 606 and nut 624 is positioned against and centered on base plate 621. Although not visible in FIG. 6, the base plate 621 may have a bolt cutout (typically circular) centered on both the length and the width of the base plate 621. The bolt cutout is typically a substantially larger diameter than the diameter of shoulder bolt 606, but somewhat smaller than or about equal to the diameter of the standoff 604, and sufficiently large enough that after the standoff 604 is positioned against and centered on base plate 621, the shoulder bolt 606 is accessible through the bolt cutout (for adjustment, maintenance or otherwise). The standoff 604 is secured to the base plate 621 by tack welding, welding, soldering or other conventional means.

The latch rods 611 (less clevises 612, pins 607, clips 609 and lock nuts 608) are inserted through the guide cutouts 633 such that threaded ends of the latch rods 611 are positioned at or near the handle 601. The lock nuts 608 and clevises 612 (less pins 607 and clips 609) are screwed onto the threaded ends of the latch rods 611, and the clevises 612 are positioned with respect to the guides 602 such that the handle 601 is in the mouth of each of the clevises 612 and the guides 602 are aligned with the clevises 612. The pins 608 are then inserted into clevises 612 and through the guides 602. Clips 609 are then attached, connected or inserted into pins 607. The pins 607 are free to rotate and move within the guides 602 as the handle 601 rotates, thereby providing for smooth movement of the pins 607 within the guides 602. The lock nuts 608 are loosened or tightened to initially adjust the operating length of the latch rods 611.

The assembled latch system may then be mounted and/or attached to the mechanism to be latched. In the embodiment of FIG. 6, the base plate 621 comprises eight mounting holes 632, and the latch system 600 may be attached to the mechanism to be latched with screws, or bolts and nuts. As indicated previously, however, the latch system may also be attached to the mechanism to be latched by tack welding, welding or soldering the assembled latch system to the mechanism. Additional loosing or tightening of the lock nuts 608 may be made after the assembled latch system is attached and/or mounted to the item to be latched to finally adjust the length of the latch rods 611 for proper engagement. If utilized, strike plates 614A & 614B may be properly oriented and attached (by tack welding, welding, soldering, bolting, screwing or other convention method) at appropriate locations on the item to which the mechanism is to be latched (e.g., truck body, door frame, drawer frame, etc.).

Although assembly of the latch system 600 is described above in a step by step and/or ordered manner, components of the latch system 600 may be assembled in any order that allows for proper operation of the latch system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the components and elements described herein and their equivalents.

What is claimed is:

1. A self-engaging latch system comprising:

a handle having two guides, the handle operably connected to a spring;

two latch rods, wherein each of the two latch rods remain linear along their entire length, the two latch rods comprising clevises at ends, the clevises operably connected to the two guides; and at least two strike plates, the strike plates comprising ramp portions and back portions;

wherein when a mechanism to be latched is moved, opposite ends of the two latch rods contact the ramp portions of the strike plates causing: (i) the two latch rods to retract linearly along a same axis, decreasing a distance from the ends of the two latch rods to a center of the handle; (ii) the clevises to move within the guides; and (iii) the handle to rotate in a direction increasing tension on the spring; and wherein when the two latch rods move beyond the ramp portions of the strike plates, the tension in the spring causes: (i) the clevises to move within the guides, (ii) the handle to rotate in an opposite direction causing the two latch rods to extend linearly along the same axis, and (iii) the two latch rods to contact the back portions of the strike plates thereby engaging the self-engaging latch system.

2. The self-engaging latch system of claim 1, wherein the latch system is disengaged from the strike plates by rotating the handle in the direction, causing the clevises to move within the guides, decreasing a distance from the ends to the center of the handle, and linearly retracting the two latch rods along the same axis, thereby allowing the mechanism to move.

3. The self-engaging latch system of claim 1, wherein each clevis comprises a pin that rotates and moves within one of the guides.

4. The self-engaging latch system of claim 1, wherein each clevis comprises a lock nut for adjusting a length of one of the two latch rods.

5. The self-engaging latch system of claim 1, wherein the spring is a torsion spring that applies equal tension to each of the two latch rods, thereby preventing binding of the latch system.

6. The self-engaging latch system of claim 1, further comprising a base plate for mounting the latch system to the mechanism to be latched.

7. The self-engaging latch system of claim 6, wherein the base plate further comprises at least two guide plates, wherein the two latch rods move linearly within the guide plates.

8. The latch system of claim 1, further comprising a standoff and a cap, the standoff fixing a height of the handle, and an end of the spring operably attached to the cap.

9. The latch system of claim 8, wherein an opposite end of the spring is operably attached to the handle.

10. The latch system of claim 8, further comprising a shoulder bolt, wherein the shoulder bolt operably connects the standoff, the cap and the handle to the base plate and provides support for a coil of the spring.

11. A latch system, comprising:

a handle having two guides, the handle operably connected to a spring;

two latch rods, wherein each of the two latch rods remain linear along their entire length, the two latch rods comprising clevises at ends, the clevises operably connected to the two guides; and wherein when the handle is rotated in a direction, the clevises move within the guides, decreasing a distance from the ends to a center of the handle, and linearly retracting the two latch rods along a same axis, thereby disengaging the two latch rods and allowing a mechanism to move; and wherein when the handle is rotated in an opposite direction, the clevises move within the guides, increasing a distance from the ends to the center of the handle, and linearly extending the two latch rods along the same axis, thereby engaging the latch rods and preventing movement of the mechanism.

12. The latch system of claim 11, further comprising strike plates, wherein the two latch rods contact the strike plates to engage the mechanism.

13. The latch system of claim 11, wherein each clevis comprises a pin that rotates and moves within one of the guides.

14. The latch system of claim 11, wherein the spring is a torsion spring that applies equal tension to each of the two latch rods, thereby preventing binding of the latch system.

15. The latch system of claim 11, further comprising a base plate for mounting the latch system to the mechanism.

16. The latch system of claim 15, wherein the base plate further comprises at least two guide plates, wherein the two latch rods move linearly within the guide plates.

17. The latch system of claim 15, further comprising a standoff and a cap, the standoff fixing a height of the handle, and an end of the spring operably attached to cap.

18. The latch system of claim 17, wherein an opposite end of the spring is operably attached to the handle.

19. The latch system of claim 17, further comprising a shoulder bolt, wherein the shoulder bolt operably connects the standoff, the cap and the handle to the base plate and provides support for a coil of the spring.

20. A latch system comprising:

a base plate for mounting the latch system to a mechanism to be latched;

a handle having two guides, the handle operably connected to a torsion spring;

two latch rods, wherein each of the two latch rods remain linear along their entire length, the two latch rods comprising clevises at the ends, each clevis having a pin that rotates and moves in one of the two guides;

at least two guide plates attached to the base plate, the two latch rods moving linearly and in alignment within the guide plates;

a standoff;

a cap attached to the standoff, an end of the spring operably attached to the cap;

two strike plates, the strike plates having ramp portions and back portions;

a shoulder bolt providing support for a coil of the torsion spring;

wherein the torsion spring applies equal tension to each of the two latch rods, thereby preventing binding of the latch system;

wherein when a mechanism to be latched is moved, opposite ends of the two latch rods contact the ramp portions of the strike plates causing: (i) the two latch rods to retract linearly along a same axis, decreasing a distance from the ends of the two latch rods to a center of the handle; (ii) the clevises to move within the guides; and (iii) the handle to rotate in a direction increasing tension on the spring; and wherein when the two latch rods move beyond the ramp portions of the strike plates, the tension in the spring causes: (i) the clevises to move within the guides, (ii) the handle to rotate in an opposite direction causing the two latch rods to extend linearly along the same axis, and (iii) the two latch rods to contact the back portions of the strike plates thereby engaging the self-engaging latch system.

* * * * *